Jan. 5, 1926.  
V. ARKIN  
1,568,394  
HYDRAULIC POWER TRANSMISSION  
Filed Oct. 15, 1923

INVENTOR  
V. Arkin  
BY  
ATTORNEYS

Patented Jan. 5, 1926.

1,568,394

UNITED STATES PATENT OFFICE.

VICTOR ARKIN, OF CHICAGO, ILLINOIS.

HYDRAULIC POWER TRANSMISSION.

Application filed October 15, 1923. Serial No. 668,784.

*To all whom it may concern:*

Be it known that I, VICTOR ARKIN, a citizen of the United States, and a resident of Chicago, in the county of Cook and State of Illinois, have invented a new and useful Improvement in Hydraulic Power Transmissions, of which the following is a full, clear, and exact description.

My invention relates to improvements in hydraulic power transmission, and it consists in the combinations, constructions, and arrangements herein described and claimed.

An object of my invention is to provide a transmission of the character described in which a fluid is employed for effecting a driving engagement of one shaft with another as in the case of the engine shaft and the propeller shaft of a motor vehicle.

A further object of my invention is to provide a transmission of the character described in which the driving engagement of one shaft with another may be effected gradually with a cushioning effect, thereby eliminating all jolts and harsh mechanical contacting of one member with another, as in the case of the ordinary type of mechanical transmission.

A further object of my invention is to provide a transmission of the type described which is silent in operation. This advantage is particularly important when my improved transmission is employed for a motor vehicle of the passenger type.

A further object of my invention is to provide a transmission of the character described in which the engagement of a drive shaft with the driven shaft may be gradually broken without injury or strain to any of the parts of the transmission.

A further object of my invention is to provide a transmission of the type described in which oil may be employed as the liquid element, thereby maintaining all of the movable parts in perfect lubricated condition.

Other objects and advantages will appear in the following specification, and the novel features of the invention will be particularly pointed out in the appended claim.

My invention is illustrated in the accompanying drawings forming part of this application, in which—

In carrying out my invention I make use of a drive shaft 1, ordinarily the engine or motor shaft. For the purpose of illustration, let us assume that the shaft 1 is the engine shaft of a motor vehicle. A second shaft 2, in axial alignment with the shaft 1 is connected with the differential of a motor vehicle, (not shown). This shaft I shall hereinafter refer to as the driven shaft. The engine shaft 1 is provided with a stationary bearing member 3 at the extreme end of the shaft which has an integral crank portion 4.

Figure 2:
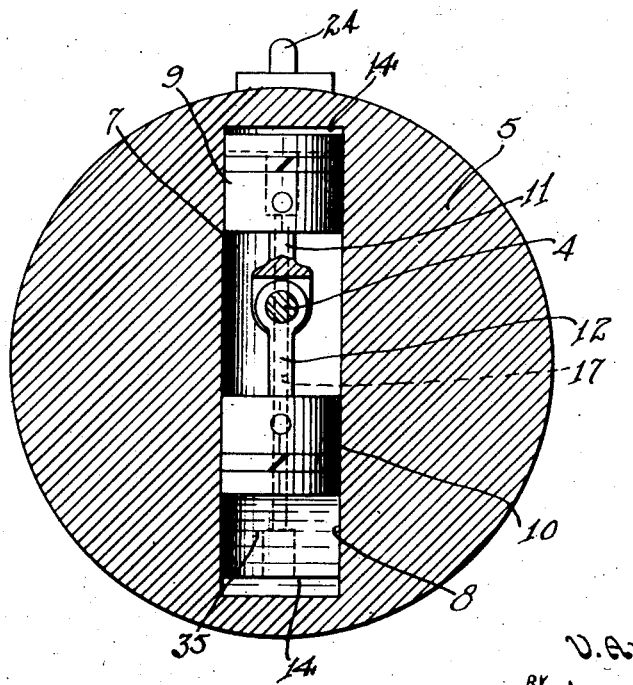
Figure 2 is a sectional view along the line 2—2 of Figure 1.

A metal casing 5, preferably of cast iron, substantially cylindrical in cross section, (see Figure 2) is rotatably mounted at one end 6 upon the shaft 1, the opposite end being permanently fixed to the shaft 2. In this case I have shown the shaft 2 and the casing 5 as integral parts. The casing 5 serves somewhat as a fly wheel or balance wheel.

The casing 5 is provided with a pair of diametrically opposed cylinder portions 7 and 8 in which pistons 9 and 10 respectively are mounted. Each of the pistons 9 and 10 is provided with connecting rods 11 and 12 respectively, the adjacent ends of which are mounted upon the crank portion 4 of the shaft 1 so that as the shaft 1 is rotated, the pistons 9 and 10 will reciprocate in their respective cylinders 7 and 8. The connecting rods 11 and 12 are of the same length, therefore when one of the pistons is on a down stroke, the opposite piston is on the up stroke relative to the center of the casing portion.

Each of the cylinders 7 and 8 is provided with ports 13 and 14 respectively at the top thereof which ports 13 and 14 are each provided with check valves 15 and 16 respectively, arranged to permit fluid or the like to pass from the cylinders to a common passage 17 controlled by the valves 15 and 16. The passage 17 communicates with a passage 18 disposed longitudinally of the shaft 2 and which passage turns laterally at 19 and communicates with the exterior wall of the shaft 2.

A stationary bearing member 20 for the shaft 2 is disposed adjacent the wall of the casing 5 and has a packing ring 21 which contacts with the wall of the casing 5 to provide a liquid-tight engagement therewith. This bearing member 20 has a manually controlled valve member 22 projected through the upper wall thereof and communicating at its lower end with an annular duct 23 formed by grooving a portion of the inner wall of the bearing member 20 so that the portion 19 of the passage 18 is in registration therewith as the shaft 2 is turned.

The valve 22 has an outlet port 24 curved at the upper end thereof and provided with a spout portion 25 arranged to overhang the top of a reservoir 26. The reservoir 26 has an outlet 27 at the lower end thereof communicating with an annular recess 28 in the end wall of the bearing member 20 within and concentric with the annular contacting element 21.

The casing 5 is further provided with a pair of by-passes 29 and 30 respectively, communicating at one end with the exterior wall of the casing and in registration with the recess 28 and at their opposite ends provided with check valves 31 and 32 respectively. The check valves communicate with the ports 13 and 14 respectively so as to permit liquid from the reservoir 26 to pass through the check valves 31 and 32 into the cylinders 7 and 8 respectively.

Figure 1:
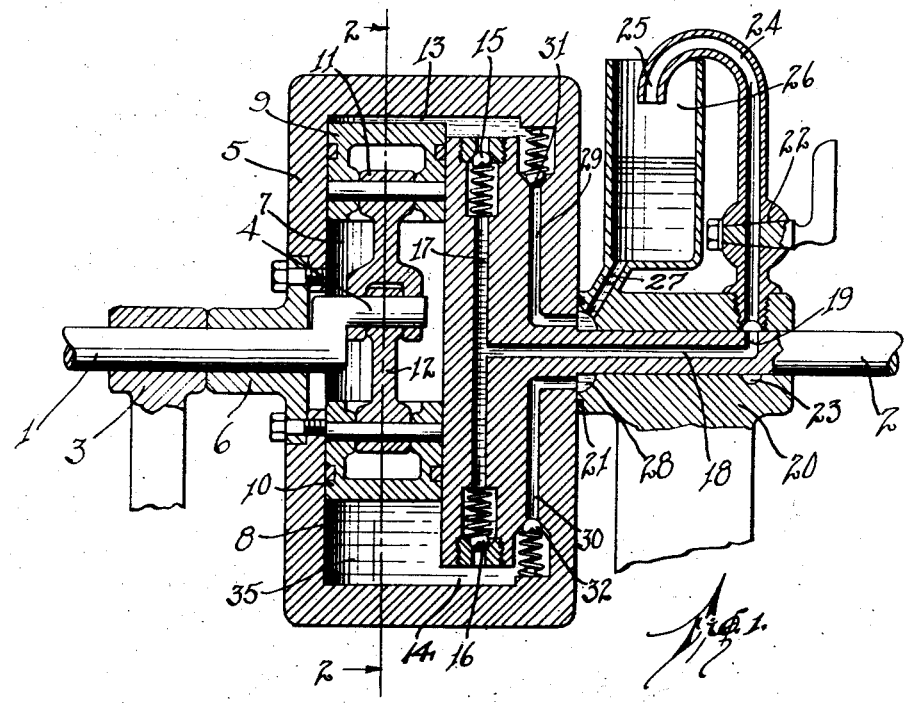
Figure 1 is a sectional view of an embodiment of my invention.

From the foregoing description of the various parts of the device, the operation thereof may be readily understood. Let us assume that power is applied to the shaft 1 by operation of the engine of which the shaft 1 is a part, and that the valve 22 is open as shown in Figure 1. Rotation of the shaft 1 will occasion a reciprocating movement of the pistons 9 and 10 within their respective cylinders 7 and 8. As the pistons 9 and 10 reciprocate in their cylinders, oil or other suitable liquid 35 is forced out through the check valves 15 and 16, through the passages 17 and 18, and through the valve 22 into the reservoir 26. It should be noted that at this time the casing 5 is stationary relative to the rotating shaft movement, and that therefore the shaft 2 is stationary.

The oil in the reservoir 26 is drawn through the passage 27, through the by-passes 29 and 30, and the check valves 31 and 32 respectively, back into the cylinders 7 and 8. This movement of the oil of course is occasioned only upon the down stroke of each of the pistons 9 and 10 respectively, while the movement of the oil out of the cylinder is occasioned by the up stroke of the pistons.

Now let us assume that the valve 22 is suddenly closed. It is apparent under these conditions that oil in the cylinders 7 and 8 cannot be moved therefrom and that the pistons 9 and 10 may not reciprocate freely within the cylinders, but will stop in their movement within the cylinders. This virtual jamming of the pistons within the cylinders by a non-compressible medium occasions a locking of the shaft 1 to the casing 5 in such a manner as to cause the casing 5 to turn with the shaft 1 and consequently drive the shaft 2.

If the valve 22 is now opened, the oil 35 may pass out of the cylinders 7 and 8 respectively, and once again the disengagement of the shaft 1 and the shaft 2 is effected.

Obviously the valve 22 may be connected with some suitable throttle rod adjacent to the driver's seat, and its operation greatly facilitated. If the valve 22 is operated gradually or is opened very slowly, to a small extent the movement of the oil will be slow, and only a given quantity will escape into the reservoir 26, thereby reducing the driving speed ratio between the shafts 1 and 2. This feature is one of utmost importance, since by its development I may gradually change the speed ratio between the drive shaft and the driven shaft very gradually and effectually.

A further use to which my improved transmission may be put is for coupling electric motors or the like to slower speed machinery usually of a heavy type, where ordinarily the reduction gear with its consequent friction is employed. The use of my improved transmission of course eliminates all gears and belts ordinarily employed.

My improved transmission device operates with practically no internal friction when the device is set so that the drive shaft is in full engagement with the driven shaft.

I claim:

The combination with a drive shaft and a driven shaft, of a casing carried by the driven shaft, a stationary bearing member for said driven shaft abutting the side wall of said casing, a pair of diametrically opposed cylinders disposed within said casing, a reservoir supported upon said stationary bearing, passages connecting each of the cylinders with a recess provided in the adjacent abutting end wall of the bearing, a passage extending from said recess to the reservoir, check valves disposed at the mouths of said passages where the passages communicate with the cylinders for the purpose of admitting fluid from the reservoir to the cylinders, passages communicating with said cylinders adjacent to the mouths of the first named passages and communicating with the exterior wall of the driven shaft within said bearing, said bearing having a recess on the inner wall in registration with the mouth of the passage through the shaft, a duct having a valve therein connected with the recess on the inner wall of the bearing and communicating at its opposite end with the reservoir, and check valves for the last named passages disposed adjacent to the mouths of the passages at the cylinders for permitting the flow of fluid from the cylinders.

VICTOR ARKIN.